(12) United States Patent
Doehle et al.

(10) Patent No.: US 8,895,112 B2
(45) Date of Patent: Nov. 25, 2014

(54) METHOD FOR EDGE SEALING A FIBER-REINFORCED COMPONENT

(75) Inventors: Guenter Doehle, Bremen (DE); Klaus Edelmann, Bremen (DE); Hans-Juergen Weber, Verden (DE)

(73) Assignee: Airbus Operations GmbH, Hamburg (DE)

( * ) Notice: Subject to any disclaimer, the term of this patent is extended or adjusted under 35 U.S.C. 154(b) by 592 days.

(21) Appl. No.: 12/980,405

(22) Filed: Dec. 29, 2010

(65) Prior Publication Data

US 2011/0159229 A1 Jun. 30, 2011

Related U.S. Application Data

(60) Provisional application No. 61/290,517, filed on Dec. 29, 2009.

(30) Foreign Application Priority Data

Dec. 29, 2009 (DE) .......................... 10 2009 060 692

(51) Int. Cl.
| | |
|---|---|
| *B05D 1/04* | (2006.01) |
| *B05D 1/06* | (2006.01) |
| *F16J 15/10* | (2006.01) |
| *C09D 5/03* | (2006.01) |
| *B05B 5/03* | (2006.01) |

(52) U.S. Cl.
CPC ................ *F16J 15/108* (2013.01); *B05B 5/032* (2013.01); *C09D 5/03* (2013.01)
USPC ............................ 427/467; 427/284; 427/475

(58) Field of Classification Search
USPC .......................................... 427/467, 475, 284
See application file for complete search history.

(56) References Cited

U.S. PATENT DOCUMENTS

| | | | | |
|---|---|---|---|---|
| 4,480,008 | A | * | 10/1984 | Farronato et al. .......... 428/425.8 |
| 6,268,022 | B1 | * | 7/2001 | Schlegel et al. ............... 427/471 |
| 7,867,555 | B2 | | 1/2011 | O'Dell et al. |
| 2004/0159724 | A1 | | 8/2004 | van der Steur |
| 2009/0104368 | A1 | * | 4/2009 | Seitz ............................. 427/475 |
| 2009/0220795 | A1 | * | 9/2009 | Connelly et al. .............. 428/414 |
| 2010/0186882 | A1 | | 7/2010 | Edelmann et al. |

FOREIGN PATENT DOCUMENTS

| | | |
|---|---|---|
| DE | 4011320 C2 | 2/1994 |
| DE | 19742867 C1 | 12/1998 |
| DE | 102007037649 A1 | 2/2009 |
| DE | 602005006388 T2 | 6/2009 |

* cited by examiner

*Primary Examiner* — Frederick Parker
(74) *Attorney, Agent, or Firm* — Leydig, Voit & Mayer, Ltd.

(57) ABSTRACT

A method for edge sealing a fiber-reinforced component formed from a carbon fiber-reinforced thermoplastic or duroplastic plastic material includes electrostatic coating of at least one section of an edge of the component with a thermoplastic powder so as to form a powder coating; and fusing and cross-linking the powder coating in a furnace so as to create a smooth edge seal.

8 Claims, 1 Drawing Sheet

METHOD FOR EDGE SEALING A FIBER-REINFORCED COMPONENT

CROSS REFERENCE TO PRIOR APPLICATIONS

Priority is claimed to German Application No. DE 10 2009 060 692.0, filed Dec. 29, 2009 and U.S. Provisional Application No. 61/290,517, filed Dec. 29, 2009. The entire disclosure of both applications is incorporated by reference herein.

FIELD

The invention pertains to a method for edge sealing a fiber-reinforced component, particularly a connecting angle, wherein the component is formed with a carbon fiber-reinforced thermoplastic or duroplastic plastic material, particularly as a protection against contact corrosion in an interface area with metallic components.

The invention furthermore pertains to a device for implementing the method, as well as to a fiber-reinforced component treated in accordance with said method.

BACKGROUND

In modern aircraft construction, metallic materials are replaced with components of carbon fiber-reinforced plastics (CFRP), particularly for weight reasons. In the interface area between CFRP-components and metallic components, particularly components formed with aluminum alloys, contact corrosion may occur due to voltage differences between the different materials. For example, connecting angles (so-called "clips") for connecting the skin to the frames of a primary structure of an aircraft fuselage are increasingly manufactured with carbon fiber-reinforced thermoplastic materials. They are manufactured from plate-shaped, carbon fiber-reinforced semifinished products in the so-called thermoplastic "punch forming process." Excess material areas nowadays are usually removed from the blank in a milling process so as to realize a predefined contour of the CFRP-component. The thusly created milled component edges can be sealed, for example, with a synthetic enamel that is currently applied manually on each CFRP-component in order to avoid the above-described corrosion problems in the interface area with metallic components. Alternatively, any single-component or two-component synthetic resin system may also be used. However, the manual application of the edge seal is labor-intensive and therefore elaborate with respect to the manufacturing technology. In addition, the manual application of the edge seal does not provide a reliable consistency of the application results, particularly with respect to the material thickness and/or the coverage.

A multitude of devices and methods for powder coating objects are known from the state of the art. For example, DE 60 2005 006 388 T2 describes a novel powder coating system that utilizes pigmented and free-flowing powder compositions, wherein these powder compositions make it possible to realize a faster color change and to simplify the cleaning of the powder coating system.

SUMMARY OF THE INVENTION

An aspect of the present invention provides a method for creating edge seals on thermoplastic or duroplastic CFRP-components, particularly as a protection against contact corrosion in an interface area with metallic components, wherein said method is less elaborate with respect to the manufacturing technology and can be automated in a superior fashion.

In an embodiment, the method includes the following steps:
a) at least sectional electrostatic coating of at least one component edge with a thermoplastic powder,
b) fusing and cross-linking the powder coating in a furnace in order to create a smooth edge seal.

This makes it possible to achieve a preferably localized coating of the component edges and to observe an exactly predefined material thickness. In addition, the formation of the edge seal with a thermoplastic powder that is subsequently fused into a smooth edge seal in a furnace is advantageous with respect to environmental aspects because no single-component or two-component plastic materials that contain solvents such as, for example, polyurethane or epoxy resin lacquers are required. In comparison with liquid plastic or coating materials, powder coatings can also be processed and automatically applied in a simpler fashion. Surfaces outside the edge regions to be sealed usually need to be provided with a temporary covering in the form of, for example, masking tape, masks or the like during the powder coating process.

According to one additional development of the method, the fusing and cross-linking of the powder takes place at a temperature between 120° C. and 320° C.

Due to this measure, nearly all known powdery thermoplastic coating materials can be transformed into a smooth, mechanically durable and firmly adhering edge seal.

According to another embodiment of the method, the thermoplastic powder initially is electrostatically charged with respect to the component and subsequently atomized with compressed air.

As a result of this additional development, conventional powder coating processes can be utilized for the inventive method.

According to another embodiment of the method, excess material is removed from the component prior to the powder coating in order to create defined component edges.

Due to this measure, a predefined nominal geometric contour of the CFRP-component is initially achieved. The surface of the component edges is also sufficiently rough for ensuring an adequate adhesion of the edge seal to be applied. All reinforcing fibers with an excess length furthermore are shortened during the course of this processing step such that any reinforcing fibers protruding in the edge region cannot puncture the edge seal to be applied.

According to an additional development of the method, the removal of the excess material is realized by means of milling, grinding, cutting, sawing, water jet cutting, laser beam cutting and/or any combination of at least two of the aforementioned methods.

Water jet cutting and laser beam cutting, in particular, respectively make it possible to realize highly precise cuts with a high cutting speed and the least possible tool wear such that a long tool life can be achieved. The aforementioned cutting methods furthermore allow a dustless and chipless cutting process such that no exhaust devices need to be provided. Milling proved particularly suitable for contouring the component edges because the thusly produced roughing of the component edges significantly improves the adhesion of the thermoplastic edge seal. However, cutting methods that generate significant heat such as, for example, laser beam cutting are only conditionally suitable in instances, in which the CFRP-component is formed with a thermoplastic matrix.

A further embodiment provides at least one manipulator, particularly an articulated robot, at least one electrostatic spray gun, at least one holder for accommodating the at least one component and at least one furnace.

Due to this embodiment, the method for forming an edge seal on a component edge by means of a thermoplastic powder coating on a CFRP-component can be fully automated with justifiable expenditures. In this case, the electrostatic spray gun can largely be positioned freely in space by means of the manipulator and/or the spray gun is statically arranged within the device and the component to be sealed in the edge region is aligned by means of a holder that can be positioned in space.

A further embodiment provides a CFRP-component, particularly a connecting angle that is powder-coated in accordance with the inventive method and serves for reinforcing a primary structure of an aircraft, wherein at least one component edge features an at least sectional powder coating, particularly as a protection against contact corrosion in an interface area with metallic components.

Due to this measure, no contact corrosion processes or other types of corrosion effects can occur in the interface area between the CFRP-component and a metallic component.

According to another embodiment of the component, the powder coating is formed with at least one thermoplastic plastic material, particularly with a polyamide.

This makes it possible to fuse the powder coating in a heating device such as, for example, a furnace in order to create a smooth edge seal of the CFRP-component. In addition, an adequate adhesion of the edge seal on the component edges is achieved largely independent of the presence of a CFRP-component matrix that is formed with a thermoplastic or with a duroplastic plastic material.

The thermoplastic plastic material for forming the edge seal may be mixed with nanoparticles, particularly with nanoparticles that are at least slightly electrically conductive. Due to this measure, the plastic material can be inductively heated in a furnace and fused in a localized fashion. This prevents a temperature-related deformation of the remaining CFRP-component. The powdery thermoplastic plastic material may also consist of a mixture (so-called "blend") that is formed of at least two thermoplastic plastics.

According to an additional development of the component, the edge seal at least sectionally encompasses the component edges.

Due to the preferably small extent of the edge seal over the component edges up to the upper side and the lower side of the component, the formation of cracks is prevented, in particular, in the region of the smallest curvature radii of the component edges such that undesirable contact corrosion due to penetrating moisture is inhibited.

DETAILED DESCRIPTION

Figure 1:
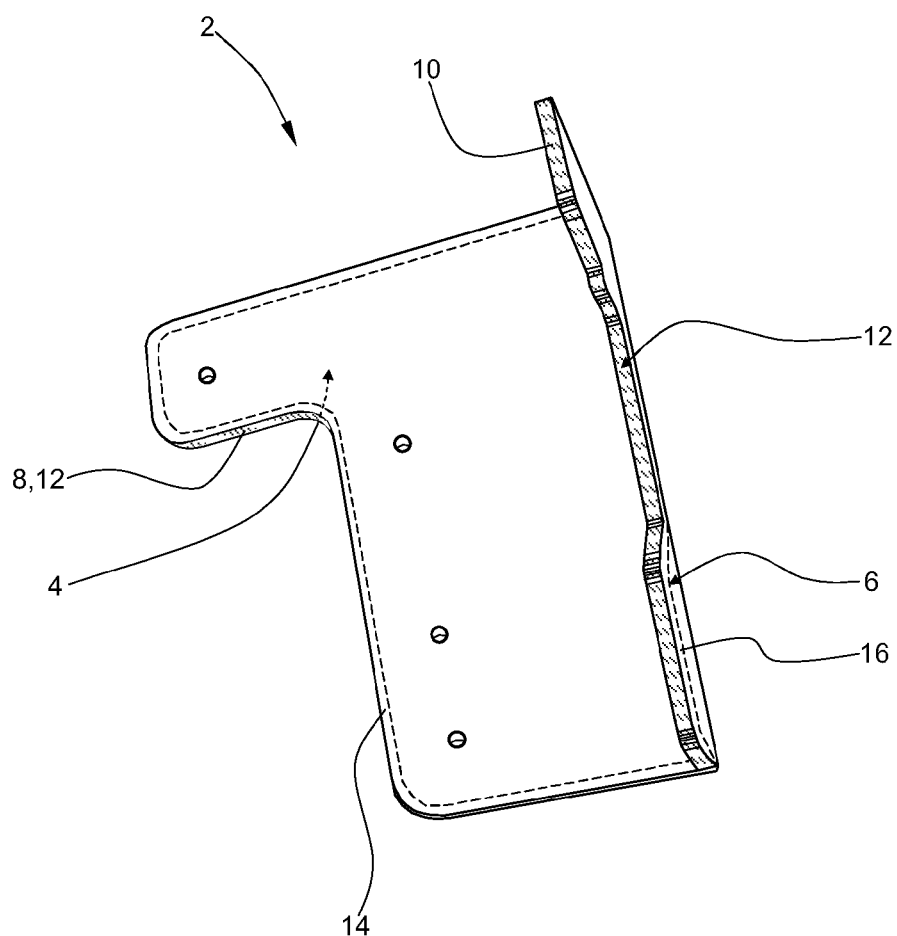
FIG. 1. shows a perspective view of a CFRP-component in the form of a connecting angle, and
FIG. 2. shows a schematic representation of a device.
In the figures, identical constructive elements are respectively identified by the same reference symbols.

FIG. 1 shows a perspective view of a connecting angle formed of a fiber-reinforced plastic material.

An exemplary CFRP-component in the form of a connecting or support angle 2 features two contact surfaces 4, 6 that are connected to one another at an angle of 90°. The contact surface 4 contains four through-bores that are not identified by reference symbols. A CFRP-component may also be formed with a more complex geometric shape such as, for example, of at least two individual parts with a respectively simpler part geometry, wherein any component edges and joining surfaces—situated in the bonding area—are already closed and sealed by the adhesive material. The connecting angle 2 is preferably manufactured with a carbon fiber-reinforced thermoplastic plastic material such that it has a slight electric conductivity in the direction, in which the embedded reinforcing fibers or carbon fibers extend. Suitable plastic materials are, for example, polyether imide (PEI), polyetheretherketone (PEEK), polyethylene terephthalate (PET) or other mechanically and thermally durable thermoplastics. Alternatively, the connecting angle 2 may also be formed with duroplastic plastic materials such as, for example, an epoxy resin. The hatching in FIG. 1 indicates that both component edges 8, 10 are provided with a continuous edge seal 12 so as to prevent, in particular, undesirable electrochemical or galvanic contact corrosion processes due to metallic components that are in contact with this area and not illustrated in the drawing. The edge seal 12 is formed of a suitable sprayed-on thermoplastic powder that, after the spring process, is fused and compacted or cross-linked in a furnace or another heating device in order to form a smooth edge seal 12 that firmly adheres to the component edges 8, 10. The edge seal 12 may at least sectionally encompass the component edges 8, 10, i.e., it extends as far as into narrow edge regions 14, 16 that adjoin and extend parallel to the component edges and are indicated with broken lines. The width of the edge regions 14, 16 referred to the component edges 8, 10 may be as large as 10 mm. This makes it possible to prevent, for example, corrosion processes due to the formation of a crack within the edge seal 12 in a transition area between the component edges 8, 10 and the edge regions of the upper and lower component sides, i.e., particularly in the region of the smallest curvature radii of the connecting angle 2.

The thermoplastic powder may consist of the same material as that used for manufacturing the connecting angle 2. Alternatively, it is also possible to use another thermoplastic powder that fuses at lower temperatures and has a lower mechanical strength or a mixture of at least two thermoplastics. The edge seal 12 is preferably formed with a polyamide (PA), with polypropylene (PP), with polyethylene (PE), with a polyether imide (PEI), a polyetheretherketone (PEEK), polyphenylene sulfide (PPS) or with a polyethylene terephthalate (PET) so as to ensure a sufficient mechanical stability (e.g., abrasion resistance, impact toughness, notch-rupture strength) and adhesion of the edge seal 12 to the component edges 8, 10 over a complete life cycle of a modern passenger aircraft. This makes it possible to largely preclude undesirable contact corrosion processes that can lead to a safety-relevant reduction of the load carrying capacity of the aircraft fuselage structure.

If the edge seal 12 is formed with the same thermoplastic material as the matrix of the connecting angle 2, a particularly intimate and mechanically durable connection between the edge seal 12 and the connecting angle 2 is achieved, but the dwell time in the furnace should not be chosen excessively long in this case so as to prevent a temperature-related deformation of the connecting angle 2. If so required, it would be possible to provide a support construction for maintaining the predefined nominal geometry of the connecting angle 2, for example, in the form of a temperature-resistant pedestal for the connecting angle 2 in the furnace.

If different thermoplastics are used for the edge seal 12 and for the matrix of the connecting angle 2, the melting point of the thermoplastic plastic used for forming the edge seal 12 preferably is lower than the melting point of the thermoplastic matrix of the connecting angle 2 so as to prevent an undefined deformation of the connecting angle 2 in the first place during the fusing of the powdery edge seal 12 in a heating device such as, for example, a furnace. The thermoplastic powder may also consist of a mixture (so-called "blend") of at least two of the above-mentioned thermoplastic plastic materials.

If the connecting angle 2 has a duroplastic matrix such as, for example, an epoxy resin matrix, no relevant deformations of the connecting angle 2 usually occur during the fusing and cross-thinking of the thermoplastic powder in a furnace.

Figure 2:
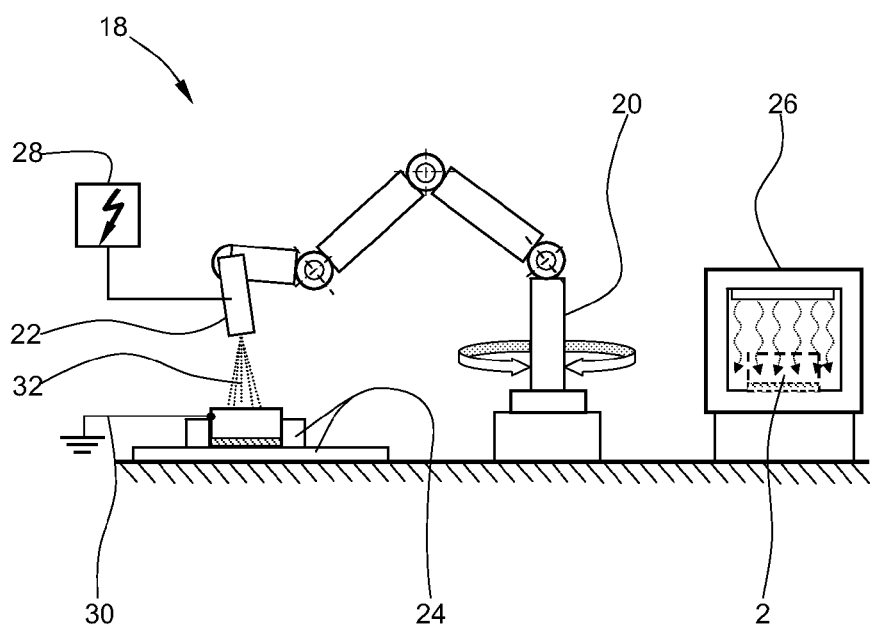

FIG. 2 shows a highly schematic representation of a device suitable for implementing the inventive method in a preferably fully automated fashion.

A device 18 comprises, among other things, a manipulator 20, an electrostatic spray gun 22, a holder 24 for accommodating the connecting angle 2 in a defined position in space and a furnace 26. The manipulator 20 may consist, for example, of an articulated robot with multiple degrees of freedom or a portal robot. The manipulator 20 makes it possible to largely position the spray gun 22 freely in space relative to the connecting angle 2. During the spraying process, the connecting angle 2 rests on the holder 24 in a defined position in space. Alternatively, the spray gun 22 is arranged stationarily and the holder 24 can be positioned in space relative to the spray gun 22 together with the connecting angle 2 accommodated therein. If only one component edge should be provided with an edge seal, for example, it may suffice to transport the connecting angle 2 past the spray gun 22 with a defined speed by means of a linear conveyor element, for example, in the form of a chain conveyor.

Before the connecting angle 2 is accommodated and fixed in position within the holder 24, it is subjected to an upstream trimming process in a not-shown cutting device, in which excess material on the edges is removed, for example, by means of grinding, milling, sawing, cutting, laser beam cutting or water jet cutting. This results in a component with a contour that exactly lies in a predefined tolerance range. This step is unnecessary if the process that is used for forming the connecting angle 2 and usually begins with a plate-shaped, fiber-reinforced thermoplastic or duroplastic semifinished product directly delivers dimensionally accurate results.

The spray gun 22 is connected to a high-voltage source 28 while the connecting angle 2 and the holder 24 are grounded, i.e., connected to the ground potential 30. The spray gun 22 features a compressed air connection that is not illustrated in order to provide a better overview. The compressed air supplied to the spray gun 22 via this compressed air connection serves for atomizing a powdery thermoplastic powder 32. For example, the thermoplastic powder 32 is positively charged by means of the high-voltage source 28 and then ejected under the influence of the compressed air. Since the connecting angle 2 is connected to the ground potential (~~0 Volt), it attracts the positively charged thermoplastic powder 32 such that it is preferably deposited on the component edges that are not identified by reference symbols in FIG. 2.

During the spraying process, the thermoplastic powder 32 is preferably deposited, among other things, on the component edges because the electrically conductive carbon fibers extend in this region essentially perpendicular to the component edges and end essentially flush therewith or only protrude slightly by less than 0.1 mm due to the mechanical edge pretreatment in the form of, for example, a milling process. Consequently, the electric field intensity locally has higher values that promote the deposition of the powder 32 in this zone.

In addition, an inner surface of the forming tool used for manufacturing the connecting angle 2 is provided with a process-related separating agent that partially deposits on the usually smooth upper side and lower side of the component after the removal from the forming tool such that excess powder 32 fused in the furnace does not or only slightly adhere to these regions and can be easily pulled off or peeled off after the completion of the furnace treatment. Some thermoplastic matrices (e.g., of polyphenylene sulfides (PPS) or polyetheretherketones (PEEK)) also may have a semi-crystalline structure, to which the powder coating barely adheres.

The aperture cross section of a spraying nozzle of the spray gun 22 may also be chosen so small that said cross section in connection with the electrostatic attraction and/or the spraying distance, i.e., the distance between the spraying nozzle and the component edge, causes the powder 32 to essentially be deposited on the component edges to be coated only. In this case, the aperture cross section or nozzle diameter should be chosen substantially smaller than the width of the component edge to be coated with the powder 32.

In order to prevent the thermoplastic powder 32 from depositing in regions outside the component edges of the connecting angle 2, the regions on the connecting angle 2 to be kept free of powder 32 may alternatively or additionally be temporarily covered with adhesive tape and/or film during the powder spraying process, wherein the adhesive tape and/or film preferably is removed again before the transfer into the furnace 26. It would furthermore be possible to provide masks, the peripheral contours of which are respectively adapted to the front and the rear side of the connecting angle 2 to be covered, wherein these masks are automatically positioned on the corresponding zones of the connecting angle 2 (outside the component edges) during the powder coating process and lifted off again after its completion.

After the electrostatic spraying of the component edges with the thermoplastic powder 32 is completed, the connecting angle 2 is transferred into the furnace 26 as indicated with a broken outline drawing in order to fuse the thermoplastic powder 32 into a smooth edge seal, as well as to cross-link and thusly compact the thermoplastic powder. The transport of the connecting angle 2 from the holder 24 into the furnace 26 is preferably realized with the manipulator 20 that features not-shown gripping and holding elements for this purpose. Accordingly, the holder 24 is also equipped with releasable gripping elements that allow an automatic release of the powder-coated connecting angle 2 after the powder coating of the component edges is completed, as well as a smooth transfer of the connecting angle to the grippers of the manipulator 20. The furnace 26 may be realized in the form of a continuous furnace so as to achieve a high throughput, in particular, for a large quantity of CFRP-components to be sealed in the edge region.

After the furnace treatment, the thermoplastic powder 32 that was electrostatically applied and subsequently fused and cross-linked in the furnace 26 in accordance with the invention forms a mechanically sturdy and durable edge seal 12, particularly for preventing contact corrosion in the interface area with aluminum components. In addition, no solvents are required during the electrostatic powder coating process such that no costly exhaust systems need to be provided in order to fulfill environmental and work safety regulations. A pedestal may be provided in order to maintain a predefined nominal geometry in the furnace 26, particularly for components with a thermoplastic matrix.

All processes within the device 18 are continuously controlled and monitored by a not-shown control unit. The fact that no solvents are used in the coating processes also simplifies the automation because no confining housings are required.

The inventive method is preferably carried out in a fully automated fashion with the aid of the aforementioned device is described below:

In a first process step, at least one component edge 8, 10 of the connecting angle 2 is at least in sections electrostatically coated with a thermoplastic powder 32. The connecting angle 2 may be manufactured with a fiber-reinforced thermoplastic or with a duroplastic plastic. The thermoplastic powder 32 is preferably sprayed on with an electrostatic spray gun 22. This spray gun has a nozzle cross section that is adapted to the material thickness of the component edges so as to achieve a largely selective powder application. In a second process step, the previously applied powder coating is fused, cross-linked and thusly compacted in a furnace 26 at a temperature between 120° C. and 320° C. in order to form a largely smooth edge seal 12 on the component edges 8, 10.

In a process step that, if so required, is carried out prior to the first process step, excess material can be removed from the edges of the connecting angle 2 that is preferably manufactured with a carbon fiber-reinforced thermoplastic plastic material in a "punch forming process" so as to create defined component edges 8, 10 and an altogether defined component contour. This also applies accordingly to a component that is manufactured with a carbon fiber-reinforced epoxy resin, for example, in an RTM-process (so-called "Resin-Transfer-Moulding" process).

In addition to the application of an edge seal, it is also possible to at least sectionally provide the upper sides and/or the lower sides or the surface of a fiber-reinforced thermoplastic CFRP-component with the thermoplastic powder coating so as to inhibit, in particular, water-induced corrosive processes. In this case, the powder coating extends beyond the edge regions 14, 16 of the component edges 8, 10 of the connecting angle 2 (see FIG. 1).

LIST OF REFERENCE SYMBOLS

2 Connecting angle
4 Contact surface
6 Contact surface
8 Component edge
10 Component edge
12 Edge seal
14 Edge region (component edge)
16 Edge region (component edge)
18 Device
20 Manipulator
22 Spray gun
24 Holder
26 Furnace
28 High-voltage source
30 Ground potential
32 Thermoplastic powder

What is claimed is:

1. A method for edge sealing a fiber-reinforced component formed from a carbon fiber-reinforced thermoplastic or duroplastic plastic material, the method comprising:

electrostatic coating of at least one section of an edge of the component with a thermoplastic powder so as to form a powder coating, wherein electrically conductive fibers extend in a region perpendicular to the edge of the component due to a mechanical edge pretreatment to promote the deposition of powder on the edge and edge regions of the component; and fusing and cross-linking the powder coating in a furnace so as to create a smooth edge seal, wherein the edge seal encompasses at least a section of the edge, thereby extending at least into an edge region that adjoins and extends parallel to the edge.

2. The method as recited in claim 1, wherein the fiber-reinforced component is a connecting angle providing protection against contact corrosion in an interface area with metallic components.

3. The method as recited in claim 1, wherein the fusing and cross-linking are performed at a temperature between 120° C. and 320° C.

4. The method as recited in claim 1, further comprising initially electrostatically charging the thermoplastic powder with respect to the component and subsequently atomizing the thermoplastic powder with compressed air.

5. The method as recited in claim 1, further comprising removing excess material from the component prior to the electrostatic coating so as to create a defined component edge.

6. The method as recited in claim 5, wherein the removing is performed using at least one of milling, sawing, grinding, cutting, water jet cutting and laser beam cutting.

7. The method as recited in claim 1, wherein the edge region has a width of about 10 mm.

8. A method for edge sealing a fiber-reinforced component formed from a carbon fiber-reinforced thermoplastic or duroplastic plastic material, the method comprising:

electrostatic coating of at least one section of an edge of the component with a thermoplastic powder using an electrostatic spray gun having a spraying nozzle so as to form a powder coating wherein the diameter of the spraying nozzle is smaller than the width of the edge of the component to promote deposition of the powder on the edge and edge regions of the component; and fusing and cross-linking the powder coating in a furnace so as to create a smooth edge seal, wherein the edge seal encompasses at least a section of the edge, thereby extending at least into an edge region that adjoins and extends parallel to the edge.

\* \* \* \* \*